(12) United States Patent
Wahler et al.

(10) Patent No.: US 7,917,679 B2
(45) Date of Patent: Mar. 29, 2011

(54) TRUSTED LPC DOCKING INTERFACE FOR DOCKING NOTEBOOK COMPUTERS TO A DOCKING STATION

(75) Inventors: Richard E. Wahler, St. James, NY (US); Jay D. Popper, Jamaica, NY (US); Eileen M. Marando, Bellmore, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 123 days.

(21) Appl. No.: 11/061,146

(22) Filed: Feb. 18, 2005

(65) Prior Publication Data

US 2006/0190653 A1     Aug. 24, 2006

(51) Int. Cl.
*G06F 13/10* (2006.01)
*G06F 13/38* (2006.01)
(52) U.S. Cl. ......................................... 710/303; 710/200
(58) Field of Classification Search .................. 710/104, 710/105, 107, 200, 300–305
See application file for complete search history.

(56) References Cited

U.S. PATENT DOCUMENTS

| | | | |
|---|---|---|---|
| 5,598,537 A | 1/1997 | Swanstrom et al. | |
| 5,598,539 A | 1/1997 | Gephardt et al. | |
| 5,632,020 A | 5/1997 | Gephardt et al. | |
| 5,798,951 A | 8/1998 | Cho et al. | |
| 5,862,349 A | 1/1999 | Cho et al. | |
| 5,873,000 A | 2/1999 | Lin et al. | |
| 5,889,964 A | 3/1999 | Cho et al. | |
| 5,901,292 A | 5/1999 | Nishigaki et al. | |
| 5,933,609 A | 8/1999 | Walker et al. | |
| 6,154,798 A | 11/2000 | Lin et al. | |
| 6,247,079 B1 | 6/2001 | Papa et al. | |
| 6,304,929 B1 | 10/2001 | Wallach et al. | |
| 6,418,492 B1 | 7/2002 | Papa et al. | |
| 6,434,650 B1 * | 8/2002 | Morris et al. | 710/110 |
| 6,460,106 B1 | 10/2002 | Stufflebeam | |
| 6,493,782 B1 | 12/2002 | Verdun et al. | |
| 6,519,669 B1 * | 2/2003 | Yanagisawa | 710/304 |
| 6,574,708 B2 * | 6/2003 | Hayter et al. | 711/118 |
| 2002/0038400 A1 | 3/2002 | Fukushima | |
| 2003/0154338 A1 * | 8/2003 | Boz et al. | 710/303 |
| 2005/0044408 A1 * | 2/2005 | Bajikar et al. | 713/201 |

* cited by examiner

*Primary Examiner* — Paul R. Myers
*Assistant Examiner* — Trisha Vu
(74) *Attorney, Agent, or Firm* — Meyertons Hood Kivlin Kowert & Goetzel, P.C.; Jeffrey C. Hood

(57) ABSTRACT

A method and apparatus for operating a portable computer configured for docking to a docking station is disclosed. In one embodiment, a portable computer system includes a docking interface having a bus switch and a bus monitoring circuit, and a bus coupled to the docking interface. With the computer coupled to a docking station, the bus switch, when closed, may couple the bus to a peripheral interface in the docking station. The bus switch may close responsive to docking, thereby completing the electrical coupling of the bus to the peripheral interface in the docking station. The portable computer being docked to the docking station, the bus monitoring circuit may monitor the bus cycles occurring on the bus and identify trusted read and/or write cycles. During trusted bus cycles the monitoring circuit may operate to open the bus switch thereby preventing information transmitted during the trusted cycles to be accessible outside of the portable computer system, even with the portable computer system remaining docked to the docking station. The monitoring circuit may also operate to close the bus switch in response to a currently occurring trusted bus cycle being interrupted, aborted and/or completed.

51 Claims, 7 Drawing Sheets

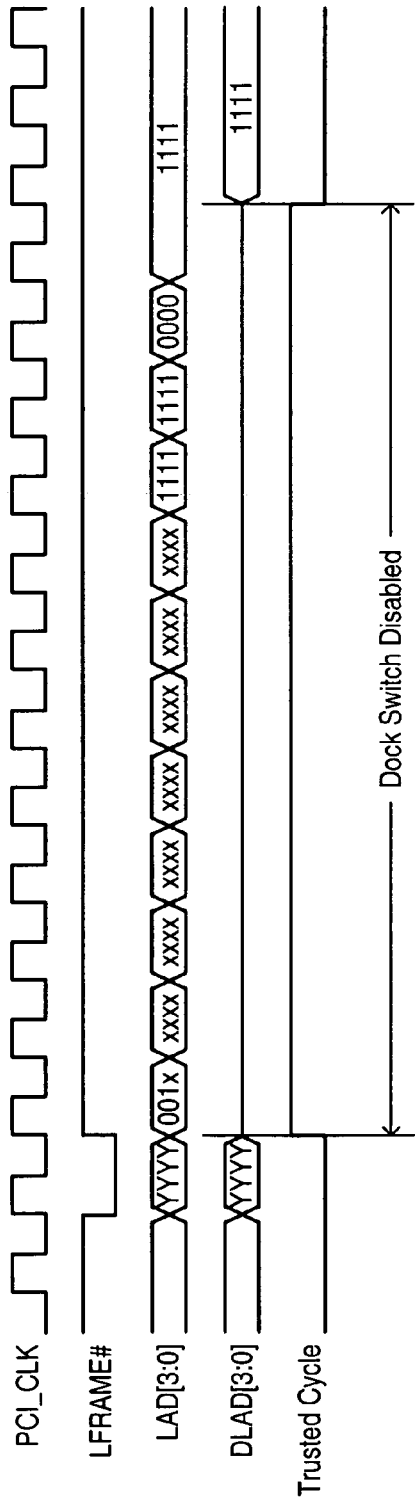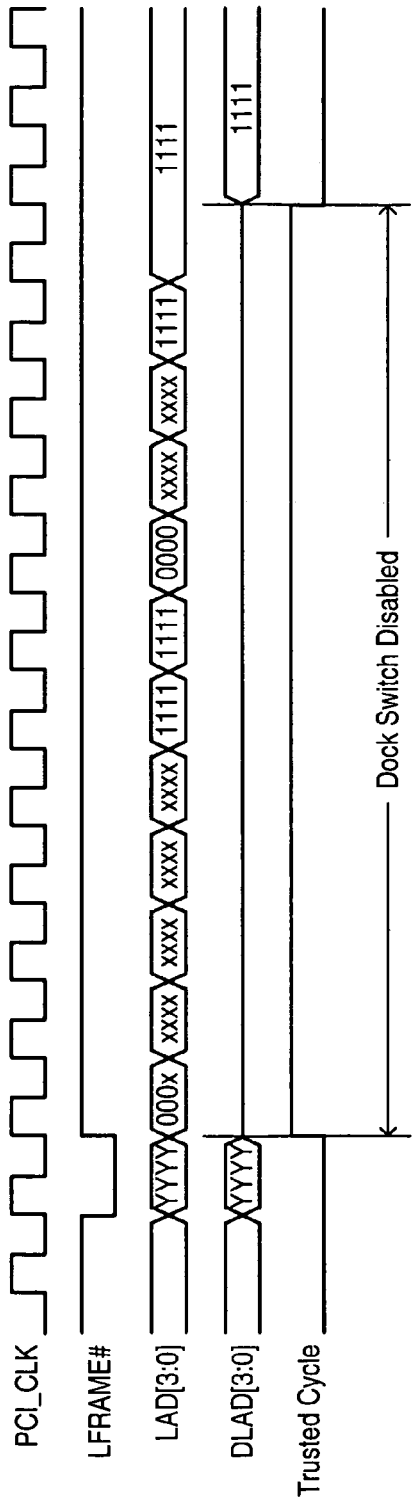

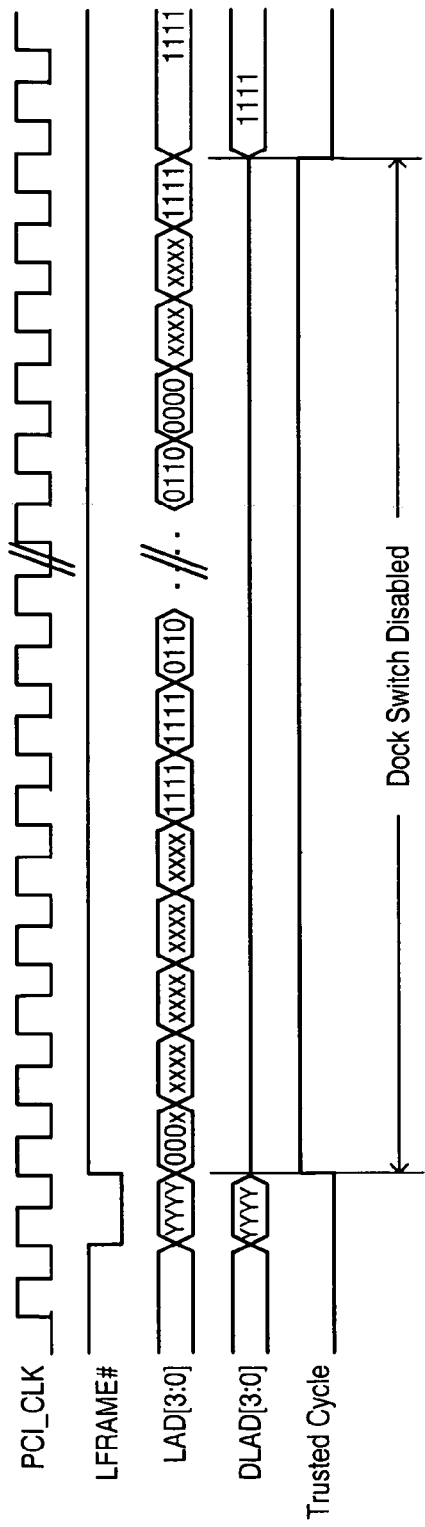
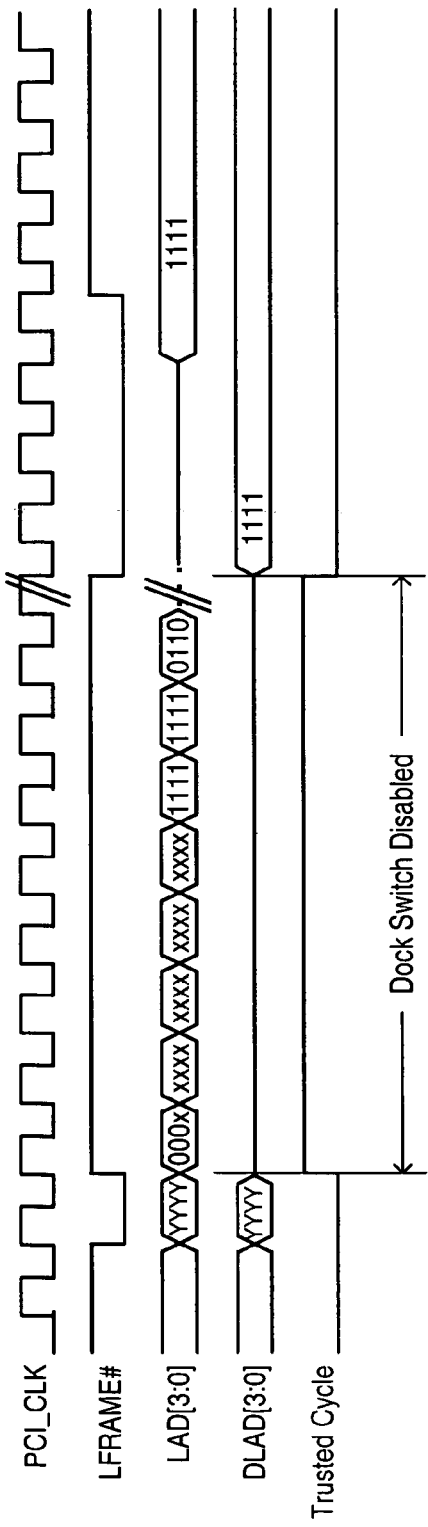

TRUSTED LPC DOCKING INTERFACE FOR DOCKING NOTEBOOK COMPUTERS TO A DOCKING STATION

BACKGROUND OF THE INVENTION

1. Field of the Invention

This invention relates to computer systems, and more particularly, to portable computer systems that may be coupled to a docking station.

2. Description of the Related Art

Portable computers enjoy widespread popularity. Advances in computer technology, such as faster processors with low power consumption, have led to portable computer systems that are comparable to desktop computers in performance. Because of these improvements, portable computers are an ideal solution for a user that needs a large amount of computing power as well as a mobile platform.

Despite the performance increases, portable computers still are at a disadvantage relative to other computers. In particular, due to their small size, portable computers typically are not able to offer as much functionality as stationary computers, as a limited number of interfaces are present. One solution to this problem is a docking station. A docking station may allow for increased functionality when the portable computer is coupled to it. Through a docking station, a portable computer may be able to utilize the functionality of such devices as a full-screen monitor, additional printers, scanners, and so forth.

Although docking stations are a convenient solution to providing additional functionality for a portable computer, coupling the portable computer to a docking station may introduce a new set of issues that require attention. One such issue has arisen due to new industry requirements for security in computers, and specifically notebook computers using "LPC (Low Pin Count) Docking". In many cases it may be required to protect information passing through a docking interface such that the information does not become accessible outside of the notebook computer.

Other corresponding issues related to the prior art will become apparent to one skilled in the art after comparing such prior art with the present invention as described herein.

SUMMARY OF THE INVENTION

A method and apparatus for operating a portable computer coupled to a docking station is disclosed. In one embodiment, the portable computer system includes a bus bridge and a bus coupled to the bus bridge. One or more peripheral devices or peripheral interfaces may be coupled to the bus. The bus may also be coupled to a docking interface. The docking interface may be an integrated circuit having a bus switch. The docking interface may be adapted to couple the bus to a peripheral interface in the docking station. When the bus switch is closed, after the computer is coupled to the docking station, the bus may be coupled to the peripheral interface, via a docking connector in the portable computer and a complementary connector in the docking station. The bus switch may close responsive to the docking, thereby completing the electrical coupling of the bus to the peripheral interface in the docking station. In one set of embodiments, the closing of the bus switch may be controlled by the docking interface such that operations on the bus are not suspended during docking operations.

In one embodiment, the bus may be a low pin count (LPC) bus. The bus switch may be a low on-resistance, high off-resistance bi-directional switch that may close to electrically couple the LPC bus to the docking connector. The docking station may include a complementary connector configured to be coupled to the docking connector of the portable computer. The complementary connector in the docking station may be electrically coupled to at least one peripheral interface. When the portable computer is connected to the docking station, a dock detect signal may be asserted and received by the docking interface. The docking interface may then initiate a sequence of events that result in the bus switch closing, thereby connecting the bus in the portable computer to the peripheral interface in the docking station. In one set of embodiments, the sequence of events that results in the closing of the bus switch may be performed without suspending operations on the bus.

In one set of embodiments, in order to support trusted LPC cycles, the bus switch may be configured to block trusted LPC cycles from being seen outside the docking interface during operation of the portable computers once the portable computer has been coupled to the docking station. The bus switch may comprise multiple switches, and once docking has been enabled, the switches may be closed. Subsequently, each LPC cycle may be tracked and a determination may be made at the beginning of each LPC cycle whether certain specified switches need to be opened or need to remain closed. In one embodiment, the start of a trusted LPC cycle is recognized upon receiving a special code indicative of a trusted LPC cycle, and after having ascertained that the LPC cycle is a trusted LPC cycle certain specified switches are opened. The specified switches may then be closed at the end of each trusted LPC cycle, or any time a trusted LPC cycle is aborted. In some embodiments, a trusted LPC cycle may be aborted by receiving a new information packet/frame prior to the trusted LPC cycle completing.

It should be noted that bus types other than the LPC bus are possible and contemplated for the method and apparatus described herein. Other types of buses may include, but are not limited to, a peripheral component interconnect (PCI) bus, an industry standard architecture or extended industry standard architecture (ISA/EISA) bus, universal serial bus (USB), general purpose instrument bus (GPIB), advanced graphics port (AGP), and so forth.

BRIEF DESCRIPTION OF THE DRAWINGS

Other aspects of the invention will become apparent upon reading the following detailed description and upon reference to the accompanying drawings in which:

FIG. 5 is a timing diagram illustrating a successfully completed trusted LPC write sequence according to one embodiment;

FIG. 6 is a timing diagram illustrating a successfully completed trusted LPC read sequence with no long synchronization pulses according to one embodiment;

FIG. 7 is a timing diagram illustrating a successfully completed trusted LPC read sequence with long synchronization pulses according to one embodiment; and FIG. 8 is a timing diagram illustrating an aborted trusted LPC read sequence with long synchronization pulses according to one embodiment.

Figure 1:
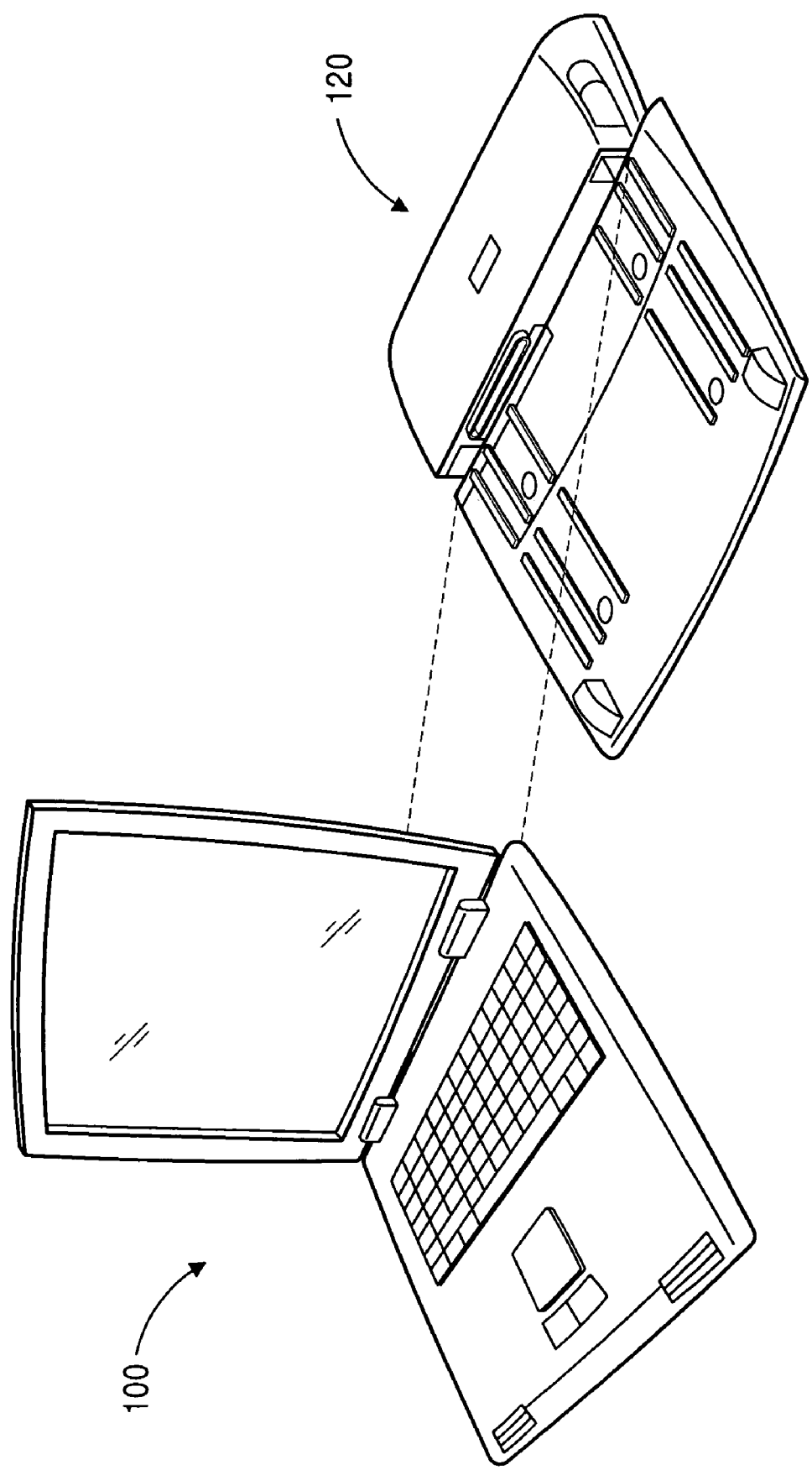
FIG. 1 is a drawing illustrating one embodiment of a portable computer and a docking station.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

The Intel® LPC Interface Specification, Revision 1.0, Sep. 29, 1997, is incorporated by reference herein in its entirety.

U.S. patent application Ser. No. 10/076,105 titled "Switched Hot Docking Interface" invented by Richard Boz, Ronald Streiber, John Virzi and Richard Wahler, and filed on Feb. 14, 2002, is hereby incorporated by reference in its entirety as though fully and completely set forth herein.

FIG. 1 is a drawing of one embodiment of a portable computer and a docking station. Portable computer 100 may be one of many different types of portable computers (i.e. laptops, notebooks, etc.). Furthermore, it is possible and contemplated that portable computer 100 may be another type of device, such as a personal digital assistant (PDA).

Docking station 120 may provide additional functionality to portable computer 100. Docking station 120 may include connections for a full-size keyboard, a monitor, a printer, and various other peripheral devices. Docking station may be able to provide the use of a full-size keyboard and monitor display when portable computer 100 is coupled to docking station 120. Various types of peripheral bus interfaces may be employed, including universal serial bus (USB), peripheral component interconnect (PCI), and/or similar bus interfaces well known in the art. Through the various interfaces in both portable computer 100 and docking station 120, the use of various devices such as flatbed and feed-through scanners, high capacity disk drives (e.g. a ZIP drive or external USB hard drive), network interfaces, printers, joysticks, a trackball or mouse, and many other devices may be employed. Although portable computer 100 may include some of the same types of interfaces as docking station 120, the docking station may provide additional interfaces, thereby expanding the functionality of the portable computer.

In one set of embodiments, portable computer 100 may also be configured for hot-docking to docking station 120. In other embodiments hot-docking may not be a requirement and power may be interrupted prior to docking portable computer 100 to docking station 120. Hot-docking may be defined here as coupling portable computer 100 to docking station 120 without an interruption in power when the computer is not in suspend mode or hibernation mode. In the embodiment shown, it may be unnecessary to power down or suspend power to portable computer 100 when coupling it to docking station 120. Furthermore, portable computer 100 may be configured to continue operations without interruption during hot-docking operations. Continuing operations may include transactions on a bus configured to electrically couple to docking station 120 as a result of hot-docking operations. Thus, operations on a bus in portable computer 100 may continue uninterrupted even while the bus is electrically coupled to docking station 120.

In one set of embodiments, portable computer 100 may be further configured to be undocked from docking station 120 without removing power. Bus transactions within portable computer 100 may continue uninterrupted during undocking operations, even after communications with docking station 120 have been terminated. Docking station 120 may be powered down responsive to the undocking.

Figure 2:
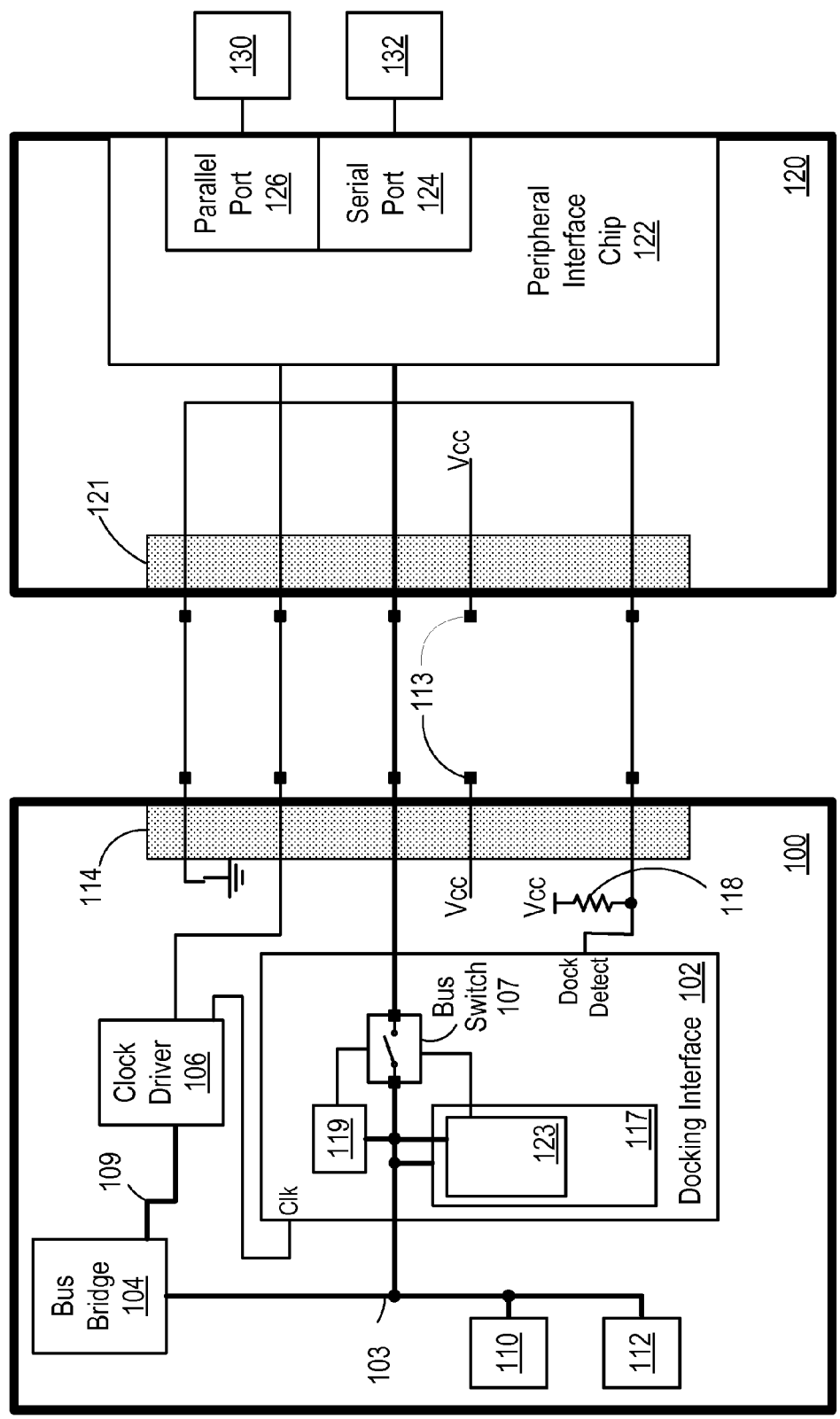
FIG. 2 is a block diagram of one embodiment of a portable computer system and a docking station, wherein the portable computer system is configured for preventing information transmitted during trusted bus cycles to be accessible outside the portable computer system with the portable computer system docked to the docking station.

Turning now to FIG. 2, a block diagram is shown of one embodiment of portable computer system 100 and docking station 120, wherein portable computer 100 may be configured for hot-docking to docking station 120. Portable computer 100 may include bus bridge 104 and docking interface 102, which may be coupled to each other via bus 103. Bus 103 may be a low pin count (LPC) bus in one embodiment, although other embodiments are possible and contemplated. As noted above, the Intel® LPC Interface Specification, Revision 1.0, Sep. 29, 1997, is incorporated by reference herein in its entirety. Other possible bus types may include a peripheral component interconnect (PCI) bus, an industry standard architecture/extended industry standard architecture (ISA/EISA) bus, an advanced graphic port (AGP) bus, a universal serial bus (USB), a general purpose instrument bus (GPIB) or other bus types well known in the art and configurable for interfacing portable computers with peripheral devices and/or docking stations.

Bus 103 may also be coupled to peripheral interfaces 110 and 112. Peripheral interfaces may allow devices to be coupled to portable computer 100, and in some cases, may be devices that are actual components of portable computer 100. Such devices may include, but are not limited to, disk drives, modems, network interfaces, Universal Asynchronous Receiver-Transmitters (UARTs), Parallel Ports, Floppy Disk, and similar peripherals well known in the art. Bus 103 may allow peripheral interfaces 110 and 112 to communicate with a processor (not shown) and a memory system (not shown) in portable computer 100. It should be noted that the portion of the bus that is actually coupled to the docking station (to the right of the switch in the drawing) may be referred to as a switched bus.

Computer system 100 also includes clock driver 106. Clock driver 106 may be coupled to bus bridge 104 by utility bus 109. Bus bridge 104 may send commands over utility bus 109 to clock driver 106 to enable or disable the clock driver outputs. In the embodiment shown, clock driver 106 has two clock outputs, one for driving a clock signal to docking interface 102 and one for driving a clock signal to docking station 120. Additional clock outputs for driving clock signals to other devices in portable computer system may also be present.

Portable computer 100 may include docking connector 114, which may be configured to couple to complementary connector 121 in docking station 120. When coupled together, docking connector 114 and complementary connector 121 may provide physical and electrical connections between portable computer 100 and docking station 120. At least one signal path through docking connector 114 may be configured to provide a dock detect signal to docking interface 102. In the embodiment shown, the dock detect signal is asserted in a logic low state. The dock detect signal may normally be pulled to a logic high state by resistor 118, which may be coupled to a power node in portable computer 100.

When docking portable computer 100 to docking station 120, the signal line associated with the dock detect signal may be coupled to a ground node, thereby causing the dock detect signal to be asserted in a logic low state. Other embodiments are possible and contemplated wherein the dock detect signal is asserted in a logic high state, and/or wherein a pull-up or pull down resistor is configured in docking station 120.

Docking connector 114 may also include power pin 113. In some embodiments, docking station 120 may be configured to receive power from portable computer 100. In the embodiment shown, power pin 113 provides a path for power from a power node of portable computer 100 to docking station 120. In some embodiments, multiple power pins may be present, as well as corresponding multiple ground pins. In other embodiments, docking station 120 may receive power from an external source separate from portable computer 100. In such embodiments, power pin 113 may be used to convey a signal to initiate a power-up sequence in docking station 120. Additional embodiments are possible and contemplated wherein the mere act of coupling portable computer 100 to docking station 120 causes power-up sequence to be executed in docking station 120. The power-up sequence may turn on power received from portable computer 100, or power received from another external source.

As previously noted, docking interface 102 may be configured to receive a dock detect signal. When docking interface 102 detects an assertion of the dock detect signal, it may begin operations to electrically couple bus 103 to peripheral interface chip 122 in docking station 120. In the embodiment shown, peripheral interface chip 122 is a single chip with multiple interfaces. Other embodiments are possible and contemplated wherein multiple interface chips are present (and configured to couple to bus 103 when portable computer 100 is docked to docking station 120). Furthermore, such interface chips may include a single interface or multiple interfaces. In the embodiment shown, peripheral interface chip 122 includes serial port 124 and parallel port 126. Serial port 124 is shown here coupling to peripheral device 132, while parallel port 126 is shown here coupling to peripheral device 130.

Docking interface 102 may include bus switch 107 coupled to bus 103, and switch control circuit 117 and cycle monitoring circuit 119 both coupled to bus 103 on one side of bus switch 107. In one embodiment, bus switch 107 is a low on-resistance, high off-resistance bi-directional switch. Bus switch 107 may also be configured to comprise multiple individual switches. Switch control circuit 117 may include a translation circuit 123 for translating various bus commands into open and close commands for bus switch 107. In one embodiment, switch control circuit 117 may receive 'write' commands via bus 103. The translation circuit 123 in switch control circuit 117 may translate these commands to an 'open' or 'close' command. Switch control circuit 117 may open or close bus switch 107 depending upon the command received. In one embodiment, cycle monitoring circuit 119 is configured to monitor bus cycles that occur on bus 103, and determine whether a given bus cycle is a trusted bus cycle. As used herein, a 'trusted bus cycle' refers to a bus cycle wherein information transmitted during the bus cycle is to be protected and is not to be made available outside the portable computer. However, a trusted bus cycle may also be defined as any special bus cycle that is to be treated differently from regular bus cycles, and other designations for trusted bus cycles are possible and are contemplated. Cycle monitoring circuit 119 may further be configured to provide a signal indicative of a trusted bus cycle to bus switch 107 if a bus cycle has been determined to be a trusted bus cycle. In one set of embodiments, cycle monitoring circuit 119 may operate in conjunction with switch control circuit 117 to open or close bus switch 107 depending upon the command received, and whether the command is part of a trusted bus cycle.

When docking interface 102 detects an assertion of the dock detect signal, it may initiate a sequence of events that result in the closing of bus switch 107. This sequence of events may include docking interface 102 communicating with bus bridge 104 to indicate that computer system 100 is coupled to docking station 120. Such communication may be performed over bus 103, or, in other embodiments, over separate signal lines that couple docking interface 102 to bus bridge 104. Bus bridge 104 may respond by forwarding one or more commands to translation circuit 123 within switch control circuit 117. These commands may be translated and may cause switch control circuit 117 to close bus switch 107. The commands may include timing and/or other information that allows the closing of bus switch 107 to be precisely timed. In order to ensure the proper timing, clock driver circuit 106 may begin driving a clock signal to docking station 120. This may allow for proper synchronization of transactions occurring between portable computer 100 and docking station 120 following the closing of bus switch 107 and subsequent utilization of docking station peripherals by portable computer 100. The closing of bus switch 107 may be performed in such a manner as to prevent or minimize electrical transients on bus 103. Precise control of the closing of bus switch 107 by switch control circuit 117 may allow the switch to be closed without any significant disturbance to current traffic on bus 103 (e.g. a transaction between bus bridge 104 and peripheral interface 110). In embodiments where bus cycles are monitored, cycle monitoring circuit 119 may operate in conjunction with switch control circuit 117 to open and/or close portions of the switches comprised in bus switch 107, depending on whether a bus cycle is a trusted bus cycle.

When bus switch 107 is closed, bus 103 may be electrically coupled to peripheral interface chip 122 in docking station 120. This may allow portable computer 100 to take advantage of the extra functionality provided by docking station 120. With bus switch 107 closed, bus bridge 104 may have a communications link to peripheral interface chip 122, and hence any peripheral devices coupled to it (e.g. peripheral devices 130 and 132).

Docking interface 102 may be further configured to initiate undocking procedures when it is desired to undock portable computer 100 from docking station 120. The initiation of undocking procedures may be a result of an input from a user of portable computer 100. For example, a user may select an "eject" option from a start menu of an operating system running on computer 100. This may eventually cause commands to be sent to the translation circuit in switch control circuit 117. Pending transactions between docking station 120 and portable computer 100 may be allowed to complete in some instances, or may be terminated in other instances. Once all transactions have been completed or terminated, switch control circuit 117 may open bus switch 107, thereby disconnecting bus 103 from peripheral interface 122 in docking station 120. It should be noted that the timing of events related to opening bus switch 107 may be similar or identical to the timing necessary for closing the switch.

Figure 3:
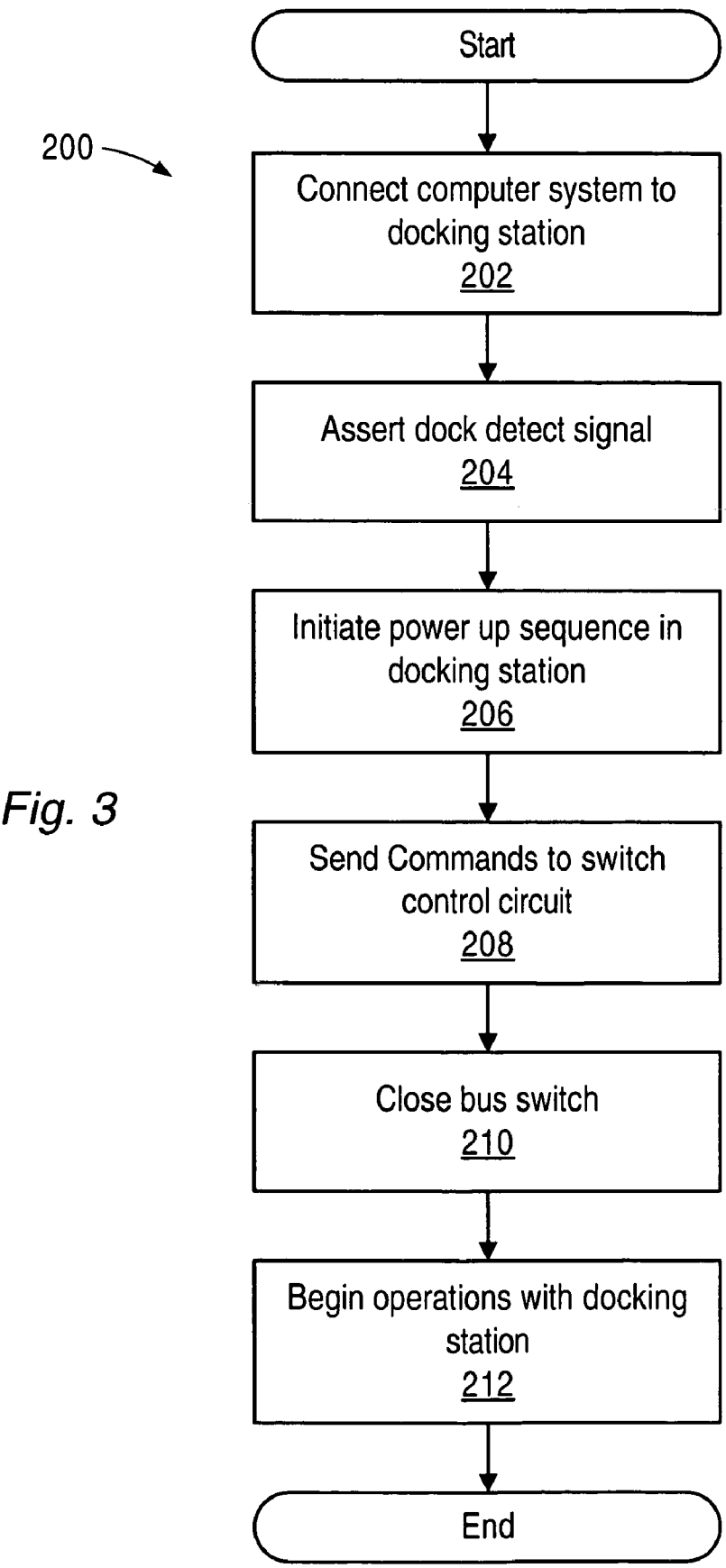
FIG. 3 is a flow diagram illustrating one embodiment of a method for docking a portable computer to a docking station.

Moving now to FIG. 3, a flow diagram illustrating one embodiment of a method for docking a portable computer to a docking station is shown. Method 200 may allow a portable computer such as portable computer 100 to be coupled to a docking station such as docking station 120. Furthermore, method 200 may allow for hot-docking a portable computer to a docking station. It should be noted that other embodiments including a greater or lesser number of items, or different items, are possible and contemplated.

In the embodiment of the method shown, a portable computer is physically coupled to the docking station (202). The physical coupling of a portable computer to a docking station may comprise the coupling of a connector on the portable computer to a complementary connector on a docking station. This may provide the physical/electrical connections that are necessary in order for the portable computer to utilize the extra functionality provided by the docking station. When the portable computer system is coupled to the docking station, a dock detect signal may be asserted (204). The dock detect signal may be received by the portable computer. In one embodiment, the dock detect signal may be received by a docking interface such as docking interface 102 of FIG. 2. When received by the docking interface or other device, the portable computer may initiate a sequence of events that allows it to become functionally coupled to the docking station.

Following the assertion and detection of the dock detect signal, a power up sequence in the docking station may be initiated (206). The power up sequence may include the portable computer supplying power to the docking station in some embodiments, while other embodiments may include the docking station receiving power from another external source. It should be noted that, in some embodiments, the docking station may be powered up prior to docking, and thus no power up sequence may be necessary. When the docking station is fully powered up, it may assert a signal to indicate that it has been powered up successfully (i.e. a 'power ok' signal). The signal may be received by the portable computer, which may begin other operations in order to initialize bus connections with the docking station, thereby allowing the portable computer to utilize additional peripheral functions.

Initializing bus connections between the portable computer and the docking station may include sending commands to a switch control circuit (208). Using the example shown in FIG. 2, switch control circuit 117 may be configured to receive a command from bus bridge 104. More particularly, bus bridge 104 may be configured to send commands to a translation circuit within switch control circuit 117. The commands may cause the switch control circuit to close a bus switch (item 210). In one set of embodiments, the closing of the bus switch may be timed such that the closing of the switch does not significantly affect any transactions occurring on the bus. Thus, again using FIG. 2 as an example, a transaction on bus 103 between peripheral device 110 and bus bridge 104 may continue even during the closing of switch 107.

As previously noted, in one embodiment, the bus may be an LPC bus. The LPC bus may include a 'turnaround' phase, or cycle. The turnaround cycle, in one embodiment, may be two system clock cycles in width, and may be initiated when the bus bridge is turning control of the bus over to a peripheral device, or when the peripheral device is returning control of the bus to the bus bridge. During a write cycle to the translation circuit, which may be implemented as a register in one embodiment, two turnaround cycles may occur. The first turnaround cycle may occur when a command is written to the register. At the beginning of the second turnaround cycle, as control of the bus is returned to the bus bridge, the switch may close, thereby electrically coupling the bus to the peripheral interface in the docking station.

Once the bus switch has been closed, the portable computer may begin operations with the docking station (212). More particularly, the bus may be used to communicate with peripherals in the portable computer and peripherals in the docking station. Thus, the portable computer may utilize extra functionality provided by the docking station. As previously noted, alternative methods to method 200 for docking the portable computer to the docking station are possible and are contemplated.

Figure 4:
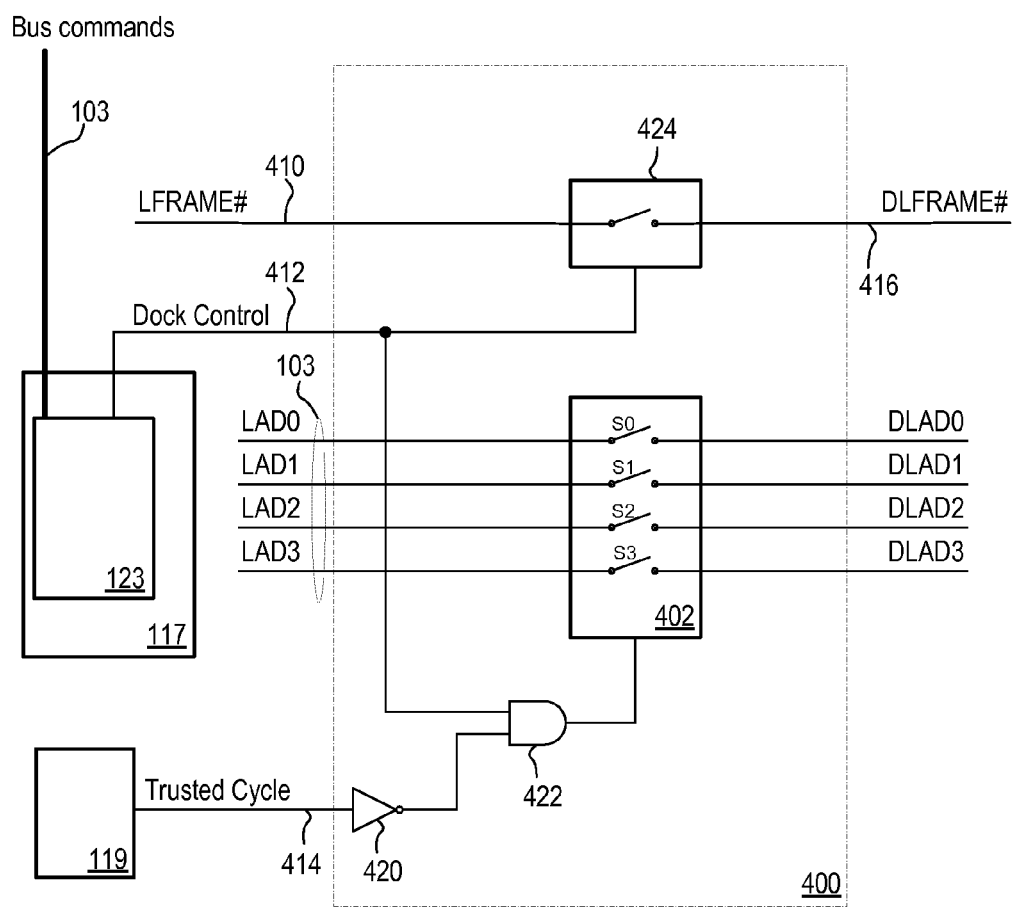
FIG. 4 is a diagram illustrating one embodiment of a switching circuit configured in a bus switch comprised in a portable computer system configured for preventing information transmitted during trusted bus cycles to be accessible outside the portable computer system with the portable computer system docked to the docking station.

Moving now to FIG. 4, one embodiment of a switching circuit 400 configured in bus switch 107, (of FIG. 2), is shown. In this embodiment, bus switch 107 comprises LPC dock switch 402, which itself comprises switches S0 through S3 coupling signal lines LAD0-LAD3 to signal lines DLAD0-DLAD3, respectively. Signals LAD0-LAD3 may be signals transmitted over bus 103 (of FIG. 2). A dock control signal 412 and trusted cycle signal 414 may be coupled to AND gate 422, with the output of AND gate 422 configured to operate as a control signal enabling/disabling switches S0-S3. In one embodiment, dock control signal 412 is generated by and received from translation circuit 123 configured within switch control circuit 117 (of FIG. 2), and trusted cycle signal 414 is generated by and received from bus monitor circuit 119 (also of FIG. 2). Dock control signal 412 may also be configured to enable/disable, independently of LPC dock switch 402, switch 424 connecting signal line 410 to signal line 416, carrying, in this embodiment, LFRAME# signal indicative of transmission of a new frame of information. It should be noted that AND gate 422 and inverter 420 are shown for illustrative purposes, and alternative configurations for controlling switches S0-S3 and switch 424 via dock control signal 412 and trusted cycle signal 414 are possible and are contemplated. In one set of embodiments, switch 424 may be used for coupling signals that are not interrupted during any portion of a trusted cycle, while switches S0-S3 in LPC dock switch 402 may be used for coupling signals that may be interrupted during at least a portion of the trusted cycle.

FIG. 5 is a timing diagram for illustrating a successfully completed operating sequence, which may be a trusted LPC write sequence (also referred to as a trusted write cycle), for one embodiment of a portable computer system configured for docking with a docking station. The operating sequence may take place once the computer has already been docked to the docking station. The embodiment shown is an exemplary embodiment, and other embodiments are possible and contemplated. Other embodiments may include additional signals not shown here, and may not include some of the signals that are shown here. Furthermore, the states of assertion (logic high or logic low) may be different for various embodiments.

In the embodiment shown in FIG. 5, a trusted write cycle may be identified by an LFRAME# signal, such as LFRAME# signal 410 in FIG. 4, being asserted and by a special code simultaneously transmitted over LAD[3:0] lines that may carry data and/or address information, such as signal lines LAD0-LAD3 in FIG. 4. In the illustrated embodiment the special code is shown as "YYYY" and is indicative of a trusted bus cycle. Information immediately following the special code on the LAD[3:0] signal lines may be indicative of the type of bus operation, in this case a write operation. This may be followed by data associated with the bus operation, also on the LAD[3:0] signal lines. In one embodiment, upon recognizing from the special code that a trusted bus cycle is taking place, a trusted cycle signal, such as trusted cycle signal 414 in FIG. 4, is asserted and remains asserted until the trusted write cycle has completed as designated by the appropriate codes transmitted over signal lines LAD[3:0]. Asserting the trusted cycle signal may result in signal lines DLAD[3:0], such as signal lines DLAD0-DLAD3 in FIG. 4, being tri-stated, thus preventing information transmitted over signal lines LAD[3:0] from being passed on to signal lines DLAD[3:0]. Upon completion of the trusted cycle, as designated by the correspondingly indicative information received over signal lines LAD[3:0], the trusted cycle signal may be de-asserted and information transmitted over signal lines LAD[3:0] may again be passed on to signal lines DLAD[3:0] as illustrated in FIG. 5 by data '1111' appearing on signal lines LAD[3:0] being mirrored on signal lines DLAD[3:0].

FIG. 6 and FIG. 7 show timing diagrams illustrative of a successfully completing trusted read cycle with no long synchronization pulses and a successfully completing trusted read cycle with long synchronization pulses, respectively, for one embodiment of a portable computer system configured for docking with a docking station. In the embodiment shown in FIG. 6, a trusted read cycle may be identified in a manner similar to identifying a trusted write cycle, by the LFRAME# signal being asserted and by the special code simultaneously transmitted over signal lines LAD[3:0], the special code followed by information indicative of a read operation. The special code is again shown as "YYYY" and is again indicative of a trusted bus cycle. The trusted cycle signal may again be asserted in a manner similar to that shown in FIG. 5, again resulting in signal lines DLAD[3:0] being tri-stated, thus preventing information transmitted over signal lines LAD[3:0] from being passed on to signal lines DLAD[3:0] during the trusted cycle. The embodiment shown in FIG. 7 is similar to that shown in FIG. 6, with the exception of additional long synchronization pulses transmitted over signal lines LAD[3:0] prior to completing the trusted read cycle, the synchronization pulses shown in FIG. 7 as data labeled '0110'.

For the embodiments of both FIG. 6 and FIG. 7, similar to the embodiment of FIG. 5, upon completion of the trusted cycle, as designated by the correspondingly indicative information received over signal lines LAD[3:0], the trusted cycle signal may be de-asserted and information transmitted over signal lines LAD[3:0] may again be passed on to signal lines DLAD[3:0] as illustrated in both FIG. 6 and FIG. 7 by data '1111' appearing on signal lines LAD[3:0] being mirrored on signal lines DLAD[3:0].

FIG. 8 shows a timing diagram of an aborted trusted read cycle for one embodiment of a portable computer system configured for docking with a docking station. The embodiment of FIG. 8 differs from the embodiment of FIG. 7 in that LFRAME# may be asserted before information indicative of the completion of the trusted cycle could be received over signal lines LAD[3:0], leading to the trusted cycle signal being de-asserted in response and information transmitted over signal lines LAD[3:0] being passed on to signal lines DLAD[3:0].

Considering the timing diagrams of FIGS. 5, 6, 7, and 8 in view of the corresponding signals in the embodiment of FIG. 4, information transmitted over signal lines LAD0-LAD3 may be passed on to signal lines DLAD0-DLAD3 any time LFRAME# signal 410 is unasserted. Whenever a special code indicating a trusted cycle is detected when LFRAME# signal 410 transitions from an unasserted state to an asserted state, signal lines DLAD0-DLAD3 may be tri-stated (or disconnected as shown) and may remain tri-stated (or disconnected) until either the end of the trusted cycle is detected or LFRAME# signal 410 is asserted, whichever event may take place first. While the embodiments discuss tri-stating and/or opening a switch as the preferred method for preventing information on signal lines LAD0-LAD3 from being passed on to signal lines DLAD0-DLAD3, methods other than tri-stating and/or opening a switch for preventing information on signal lines LAD0-LAD3 from being passed on to signal lines DLAD0-DLAD3 are possible and are contemplated.

Figure 9:
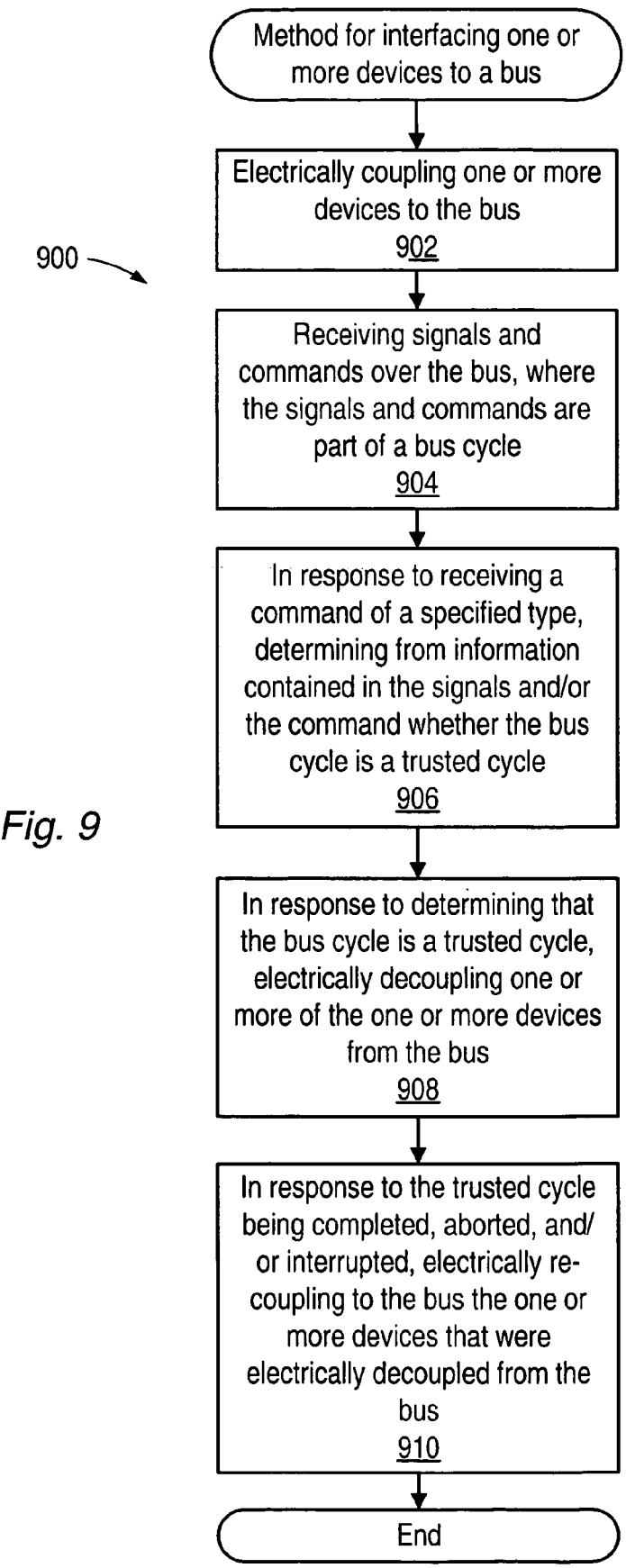
FIG. 9 is a flow diagram illustrating one embodiment of a method for interfacing devices to a bus.

Considering again the timing diagrams of FIGS. 5, 6, 7, and 8 in view of the corresponding signals in the embodiment of FIG. 4, FIG. 9 illustrates one embodiment of a method 900 for interfacing devices, for example a docking station and/or devices comprised in the docking station, to a bus while giving special consideration to specified, for example trusted, bus cycles. One or more devices may be coupled to the bus (902) and cycles on the bus may be monitored through receiving signals and commands over the bus (904). For example, cycle monitoring circuit 119 of FIG. 2 may be monitoring signals and commands received over bus 103, also of FIG. 2. In response to receiving certain commands, for example a write command as shown in FIG. 5, a determination may be made whether the current bus cycle is of a certain type, for example a trusted bus cycle (906). If it is determined, for example, that the bus cycle is indeed a trusted bus cycle, one or more of the one or more devices may be electrically decoupled from the bus (908). By way of example, in the embodiment shown in FIG. 4, the decoupling comprises opening switches S0-S3. In response to the specified cycle, in this case a trusted bus cycle, being either aborted, completed, and/or interrupted, the one or more devices that were electrically decoupled from the bus may be electrically recoupled to the bus (910). Considering the embodiment in FIG. 4 for example, interrupting a trusted read cycle, as illustrated in FIG. 8, would result in switches S0-S3 being closed. Those skilled in the art will appreciate that while references regarding method 900 were made to various embodiments presented in FIGS. 2, 4, 5 and 8, method 900 may be equally employed in various alternate embodiments, which are not shown but are contemplated.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:
1. A portable computer system, comprising:
a bus; and
a docking interface coupled to the bus, wherein the docking interface comprises:
  a bus switch configured to couple the bus to a peripheral interface in a docking station; and
  a bus monitor configured to monitor bus cycles occurring on the bus and further configured to identify specified bus cycles among the bus cycles occurring on the bus; and
a docking connector coupled to the docking interface and configured for docking the portable computer system to the docking station;
  wherein the bus switch is configured to electrically couple at least a portion of the bus to the peripheral interface, responsive to said docking;
  wherein for each specified bus cycle of the specified bus cycles, the bus monitor is further configured to:
    operate the bus switch in response to having identified the specified bus cycle, to electrically decouple a first portion of the at least a portion of the bus from the peripheral interface while leaving a remaining portion of the at least a portion of the bus electrically coupled to the peripheral interface during the specified bus cycle while the portable computer system remains docked to the docking station; and operate the bus switch in response to the specified bus cycle ending, to electrically recouple the first portion of the at least a portion of the bus to the peripheral interface while the portable computer system remains docked to the docking station.

2. The portable computer system of claim 1, wherein the bus is a low pin count (LPC) bus.

3. The portable computer system of claim 1, wherein the bus switch is a low on-resistance bi-directional switch.

4. The portable computer system of claim 1, wherein the computer system is configured to drive a clock signal to the peripheral interface.

5. The portable computer system of claim 1, wherein the docking interface includes a translation circuit, wherein the translation circuit is configured to receive commands from the bus.

6. The portable computer system of claim 5, wherein the translation circuit is configured to translate commands received from the bus in order to operate the bus switch.

7. The portable computer system of claim 6, wherein the commands comprise:
write commands; and
read commands.

8. The portable computer system of claim 1 further comprising a bus bridge coupled to the bus, wherein the bus bridge is configured to transmit commands to the docking interface.

9. The portable computer system of claim 8, wherein the docking interface includes a translation circuit configured to receive the commands from the bus bridge.

10. The portable computer system of claim 9, wherein the translation circuit is configured to translate commands received from the bus bridge in order to operate the bus switch.

11. The portable computer system of claim 10, wherein the bus switch comprises:
a first set of one or more individual switches operated by the translation circuit; and
a second set of one or more individual switches operated by the bus monitor in conjunction with the translation circuit.

12. The portable computer system of claim 9, wherein the commands comprise one or more of:
write commands; and
read commands.

13. The portable computer system of claim 1, wherein the bus is an LPC bus and the specified bus cycles are trusted LPC cycles.

14. The portable computer system of claim 13, wherein the trusted LPC cycles comprise one or more of:
trusted write operations; and
trusted read operations.

15. The portable computer system of claim 1, wherein the specified bus cycle ending results from any one or more of:
the specified bus cycle being completed;
the specified bus cycle being interrupted; and
the specified bus cycle being aborted.

16. A method for operating a portable computer, the method comprising:
physically coupling and docking the portable computer to a docking station, wherein the portable computer comprises:
a bus; and
a docking interface coupled to the bus, wherein the docking interface comprises a bus switch configured to couple the bus to a peripheral interface in the docking station;
electrically coupling the bus to the peripheral interface, wherein said coupling comprises closing the bus switch;
monitoring bus cycles occurring on the bus;
identifying specified bus cycles among the bus cycles occurring on the bus; and
in response to said identifying each specified bus cycle of the specified bus cycles:
electrically decoupling a first portion of the bus from the peripheral interface during the specified bus cycle while leaving a remaining portion of the bus electrically coupled to the peripheral interface, wherein said decoupling comprises opening the bus switch while the portable computer system remains docked to the docking station; and
electrically re-coupling the first portion of the bus to the peripheral interface, while the portable computer system remains docked to the docking station, in response to the specified bus cycle ending.

17. The method of claim 16, wherein the bus is an LPC bus.

18. The method of claim 16, wherein the bus switch is a low on-resistance bi-directional switch.

19. The method of claim 16, wherein the portable computer system further comprises a bus bridge and the docking interface further comprises a translation circuit, wherein the translation circuit is configured to translate commands received from the bus bridge, thereby generating translated commands, and operate the bus switch according to the translated commands.

20. The method of claim 19, wherein the commands comprise one or more of:
write commands; and
read commands.

21. The method of claim 19, wherein the docking interface further comprises a bus monitoring circuit, wherein said monitoring, said identifying and said decoupling are performed by the monitoring circuit in conjunction with the translation circuit.

22. The method of claim 16, wherein the bus is an LPC bus and the specified bus cycles comprise trusted LPC cycles.

23. The method of claim 22, wherein the trusted LPC cycles comprise one or more of:
trusted write operations; and
trusted read operations.

24. The method of claim 16, wherein the specified bus cycle ending results from any one or more of:
the specified bus cycle being completed;
the specified bus cycle being interrupted; and
the specified bus cycle being aborted.

25. A docking interface chip configured for use in a portable computer, the portable computer configured for docking to a docking station, the docking interface chip comprising:
a bus switch, wherein the bus switch is configured to, when closed, couple a bus in a portable computer system to a switched bus in a docking station;
a switch control circuit coupled to the bus switch, wherein the switch control circuit is configured to close the switch responsive to a docking of the portable computer to the docking station; and
a bus monitoring circuit coupled to the bus switch, wherein the bus monitoring circuit is configured to monitor bus cycles occurring on the bus and to identify specified bus cycles among the bus cycles occurring on the bus;

wherein for each specified bus cycle of the specified bus cycles, the bus monitoring circuit is configured to:
  operate the bus switch in response to having identified the specified bus cycle, to electrically decouple a first portion of the bus from the switched bus while leaving a remaining portion of the bus electrically coupled to the switched bus during the specified bus cycle while the portable computer remains docked to the docking station; and
  operate the bus switch in response to the specified bus cycle ending, to electrically recouple the first portion of the bus to the switched bus while the portable computer remains docked to the docking station.

26. The docking interface chip as recited of claim 25, wherein the bus is an LPC bus.

27. The docking interface chip of claim 25, wherein the switch control circuit includes a translation circuit configured to receive commands from the bus.

28. The docking interface chip of claim 27, wherein the switch control circuit is configured to operate the bus switch in response to the translation circuit receiving commands from the bus.

29. The docking interface chip of claim 28, wherein the commands comprise one or more of:
  write commands; and
  read commands.

30. The docking interface chip of claim 25, wherein the bus switch is a low on-resistance bi-directional switch.

31. The docking interface chip of claim 25, wherein the bus is an LPC bus and the specified bus cycles comprise trusted LPC cycles.

32. The docking interface chip of claim 31, wherein the trusted LPC cycles comprise one or more of:
  trusted read operations; and
  trusted write operations.

33. The docking interface chip of claim 25, wherein the specified bus cycle ending results from any one or more of:
  the specified bus cycle being interrupted;
  the specified bus cycle being aborted; and
  the specified bus cycle being completed.

34. A system comprising:
  a portable computer, wherein the portable computer comprises:
    a bus;
    a docking interface coupled to the bus, wherein the docking interface comprises:
      a bus switch; and
      a bus monitor; and
    a docking connector electrically coupled to the docking interface; and
  a docking station, wherein the docking station comprises:
    a complementary connector, wherein the complementary connector is configured to be coupled to the docking connector; and
    a peripheral interface chip, wherein the peripheral interface chip is configured to be coupled to the bus through the complementary connector, the docking connector, and the bus switch;
  wherein the portable computer is configured to be docked to the docking station by coupling the docking connector to the complementary connector, wherein the bus switch is configured to close and electrically couple the bus to the peripheral interface responsive to coupling the portable computer to the docking station; and
  wherein the bus monitor is configured to monitor bus cycles occurring on the bus and identify specified bus cycles among the bus cycles occurring on the bus; and
  wherein for each specified bus cycle of the specified bus cycles, the bus monitor is further configured to:
    operate the bus switch in response to having identified the specified bus cycle, to electrically decouple a first portion of the bus from the peripheral interface during the specified bus cycle while the portable computer system remains docked to the docking station; and
    operate the bus switch in response to the specified bus cycle ending, to electrically recouple the first portion of the bus to the peripheral interface while the portable computer system remains docked to the docking station.

35. The system of claim 34, wherein the bus is an LPC bus and the specified bus cycles are trusted LPC cycles.

36. The system of claim 34, wherein the specified bus cycle ending results from one or more of:
  the specified bus cycle being interrupted;
  the specified bus cycle being aborted; and
  the specified bus cycle being completed.

37. A portable computer system, comprising:
  a bus;
  a bus bridge coupled to the bus and configured to transmit commands;
  a docking interface coupled to the bus, wherein the docking interface comprises:
    a bus switch comprising a first set of one or more individual switches and a second set of one or more individual switches, and configured to couple the bus to a peripheral interface in a docking station;
    a translation circuit configured to receive commands transmitted by the bus bridge, and translate the received commands in order to operate the first set of one or more individual switches; and
    a bus monitor configured to monitor bus cycles occurring on the bus, identify specified bus cycles among the bus cycles occurring on the bus, and operate the second set of one or more individual switches in conjunction with the translation circuit; and
  a docking connector coupled to the docking interface and configured for docking the portable computer system to the docking station;
  wherein the bus switch is configured to electrically couple at least a portion of the bus to the peripheral interface, responsive to said docking; and
  wherein the bus monitor is further configured to open the bus switch during each specified bus cycle of the specified bus cycles, in response to having identified the specified bus cycle, thereby electrically decoupling at least the portion of the bus from the peripheral interface during the specified bus cycle while the portable computer system remains docked to the docking station.

38. The portable computer system of claim 37, wherein the bus is a low pin count (LPC) bus.

39. The portable computer system of claim 38, wherein the specified bus cycles are trusted LPC cycles.

40. The portable computer system of claim 39, wherein the trusted LPC cycles comprise one or more of:
  trusted write operations; and
  trusted read operations.

41. The portable computer system of claim 37, wherein the bus switch is a low on-resistance bi-directional switch.

42. The portable computer system of claim 37, wherein the computer system is configured to drive a clock signal to the peripheral interface.

43. The portable computer system of claim 37, wherein the received commands comprise one or more of:
   write commands; and
   read commands.

44. The portable computer system of claim 37, wherein the bus monitor is further configured to close the bus switch in response one or more of:
   the specified bus cycle being completed;
   the specified bus cycle being interrupted; and
   the specified bus cycle being aborted.

45. A portable computer system, comprising:
   a bus;
   a bus bridge coupled to the bus, and configured to transmit commands;
   a docking interface coupled to the bus, wherein the docking interface comprises:
      a translation circuit configured to receive commands transmitted by the bus bridge, and translate the received commands to operate the bus bridge;
      a bus switch comprising a first set of one or more individual switches operated by the translation circuit, and a second set of one or more individual switches operated by the bus monitor in conjunction with the translation circuit, wherein the bus switch is configured to couple the bus to a peripheral interface in a docking station; and
      a bus monitor configured to monitor bus cycles occurring on the bus and further configured to identify specified bus cycles among the bus cycles occurring on the bus; and
   a docking connector coupled to the docking interface and configured for docking the portable computer system to the docking station;
      wherein the bus switch is configured to electrically couple at least a portion of the bus to the peripheral interface, responsive to said docking;
      wherein for each specified bus cycle of the specified bus cycles, the bus monitor is further configured to:
         operate the bus switch in response to having identified the specified bus cycle, to electrically decouple the at least a portion of the bus from the peripheral interface during the specified bus cycle while the portable computer system remains docked to the docking station; and
         operate the bus switch in response to the specified bus cycle ending, to electrically recouple the at least a portion of the bus to the peripheral interface while the portable computer system remains docked to the docking station.

46. The portable computer system of claim 45, wherein the bus is a low pin count (LPC) bus.

47. The portable computer system of claim 46, wherein the specified bus cycles are trusted LPC cycles.

48. The portable computer system of claim 45, wherein the bus switch is a low on-resistance bi-directional switch.

49. The portable computer system of claim 45, wherein the computer system is configured to drive a clock signal to the peripheral interface.

50. The portable computer system of claim 45, wherein the commands transmitted by the bus bridge comprise one or more of:
   write commands; and
   read commands.

51. The portable computer system of claim 45, wherein the specified bus cycle ending results from any one or more of:
   the specified bus cycle being completed;
   the specified bus cycle being interrupted; and
   the specified bus cycle being aborted.

* * * * *